Jan. 8, 1924.

Re. 15,741

R. W. SCOTT

KNITTING MACHINE NEEDLE

Original Filed May 1, 1920 2 Sheets-Sheet 1

Inventor
Robert W. Scott
By Stowe & Stowe
Attorneys

Jan. 8, 1924. Re. 15,741
R. W. SCOTT
KNITTING MACHINE NEEDLE
Original Filed May 1, 1920 2 Sheets-Sheet 2
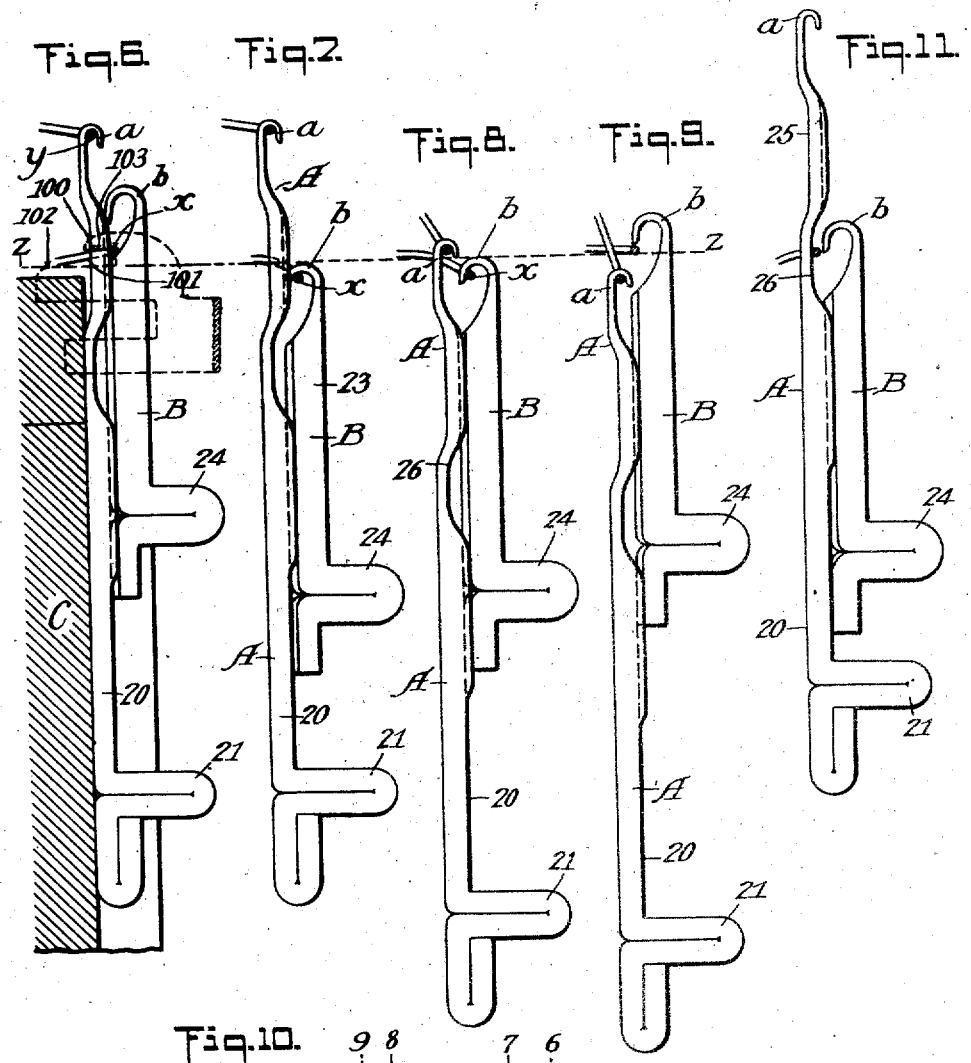
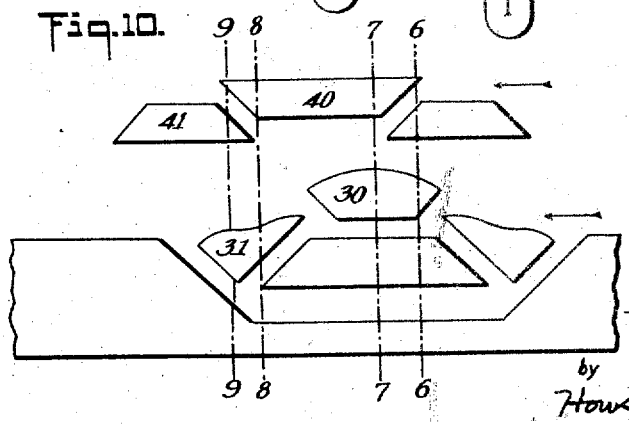
Inventor
Robert W. Scott
by
Howson and Howson
his Attorneys Reissued Jan. 8, 1924. Re. 15,741

UNITED STATES PATENT OFFICE.

ROBERT W. SCOTT, OF BABYLON, NEW YORK.

KNITTING-MACHINE NEEDLE.

Original No. 1,385,929, dated July 26, 1921, Serial No. 378,233, filed May 1, 1920. Application for reissue filed April 30, 1923. Serial No. 635,716.

DIVISION B.

*To all whom it may concern:*

Be it known that I, ROBERT W. SCOTT, a citizen of the United States of America, residing in Babylon, in the county of Suffolk, in the State of New York, have invented certain new and useful Knitting-Machine Needles, of which the following is a specification.

My invention consists of an improved construction of knitting machine needles and means for operating these needles, when employed for circular knitting of hosiery.

My needles are each in two parts, relatively movable, preferably in sliding relation to each other, one part being an instrument to draw the new loop, while the other is in the nature of a sliding latch which aids in casting off the old loop over the new loop. These two elements, which for convenience, may be termed the drawing and casting elements, are of the same width, to fit and be guided in the needle grooves of the cylinder or dial and preferably to slide upon each other.

In the accompanying drawings—

Figs. 6, 7, 8 and 9 are views showing different positions successively taken by the two needle elements in knitting;

Fig. 10 is a diagram of needle cams which may be employed to actuate these needle elements;

Fig. 11 is a view showing the positions assumed by the needle elements when elevated to the non-knitting position as in reciprocating work when knitting heels or toes of stockings.

Figure 2:
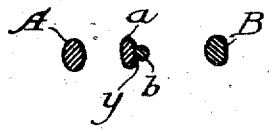
Fig. 2 is a section on the line 2—2, Fig. 1.

The element A, which I have spoken of as the drawing needle, has the main portion of its shank 20 with a butt 21, (Fig. 6), of any usual and convenient construction to be acted on by the needle cams, the shank being guided in a needle groove in the needle cylinder C or dial, as the case may be. At its operative end, this needle has a hook *a* of a shape suitable to take the yarn fed thereto from the yarn guides and draw it into a loop.

With this drawing needle A I combine a loop-carrying and casting needle element B, the shank 23 of which is preferably of the same thickness as the shank of the needle element A and adapted to be guided in the same needle groove. This element B may have any suitable form of butt 24 to be acted on by cams independently of the cams which operate the element A. This element B, in the form shown in the drawings, has at its active end a hook *b* with a return bend, the open side of the hook facing toward the hook *a* of the needle element A.

Figure 1:
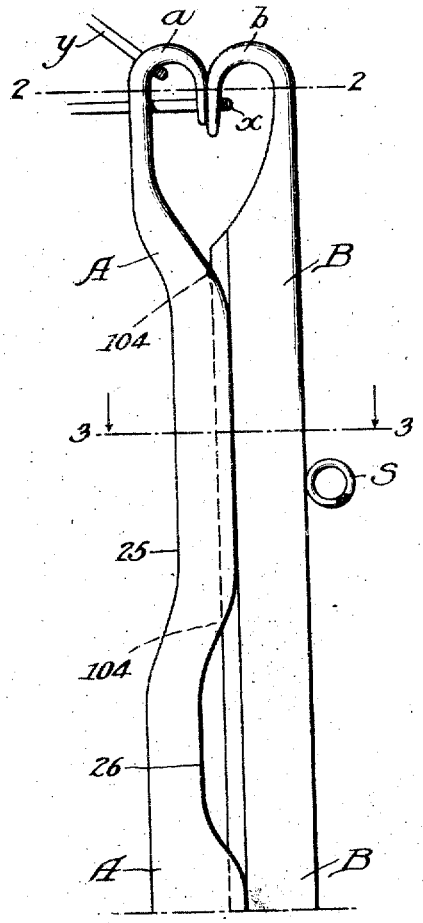
Figure 1 is a skeleton side view drawn to an enlarged scale of the operative ends of the two needle elements.

The shanks of the drawing needle A and the element B slide upon each other, and the usual coiled spring *s*, Fig. 1, bears against the outside of the shank of the element B to maintain the two elements of the needle together and in the needle grooves of the carrier.

Figure 3:
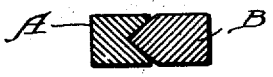
Fig. 3 is a section on the line 3—3, Fig. 1.
Figure 4:
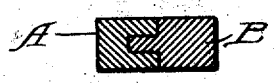
Fig. 4 is a similar section of a modification.

For a portion of the length of the shanks, toward their hooked ends, the two elements may have guiding grooved connection with each other. Preferably the shank of the needle element A has a V-shaped groove as seen at Fig. 3 to receive the adjacent V-shaped edge of the shank of the slide B. Or if preferred, some other form of grooved guiding connection, for instance such as shown in Fig. 4, may be employed.

The grooved portion of the shank of the needle element A may be formed by offsetting the shank as seen at 25 in Fig. 1. Toward their butt ends the adjacent faces of the two needle elements may have flat bearing faces, but just back of the offset 25 I prefer to form the shank of the needle A with an offset 26 in the direction the opposite of the offset 25, for a purpose which I will hereinafter explain.

Figure 5:
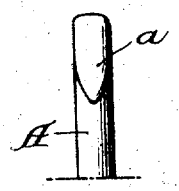
Fig. 5 is a face view of the hook of the drawing needle element.

The open sides of the hooked ends of the needle elements A and B face toward each other, as shown in the drawings, and I prefer to form the hook *a* of the part A of the flattened cross-section, such as indicated in Fig. 2, while the hook *b* of the element B may have its neck of a triangular cross-section and its outer end pointed, as also shown in the same Fig. 2. The flattened outer end of the hook *a* may be brought to a point as seen in Fig. 5.

In Figs. 6 to 9, I have shown successive positions taken by the drawing element A and the element B under the action of the needle cams shown in Fig. 10. In this Fig. 10, I have drawn dotted lines at 6, 7, 8 and 9, corresponding to the positions reached by the needles as shown in Figs. 6, 7, 8 and 9, respectively, it being assumed that the circle of needles is traveling relatively to the cams in the direction of the arrows, Fig. 10. In the several Figs. 6 to 9, the level of the bottom of the throats of web holders is indicated by the dotted line *z—z*.

In Fig. 6, the drawing element A has begun to retract under the action of the center cam 30 after taking the new yarn *y* fed to the yarn guides and the hook *b* of the element B is ready to take he old loop *x*, which is on the shank of the element A. At 7, Fig. 10, this part B has been retracted by the upper center cam 40, so that the hook *b* of this element B has drawn back the old loop *x*, Fig. 7. At 8, the part A has been retracted by the cam 31, while the part B is about to be projected under the action of the cam 41, so that as the hook *a* is about to draw the new loop *y* through the old loop *x*, Fig. 8, the hook *b* has begun to move the old loop in the opposite direction, to carry the old loop *x* over the hook *a* of the element A without frictional contact with the part A. At 9, the element A has been fully retracted by the cam 31 and has pulled the new loop *y* through the old loop *x*, while the part B continuing to be projected under the action of the cam 41, has carried the loop *x* clear of the needle element A and to the verge of the cylinder (or dial) and by the time the needle element B has reached its highest or outermost position, the hook *b* has dropped the loop *x* on the legs of the loop *y*, leaving the loop *x* and the fabric free to be fed away from the knitting point by the action of the web holders or the tension of a web take-up. The parts B with their hooks *b*, moreover, in respect to stresses on the old yard loop in the direction of the needle hook *a* virtually constitute a web-holder.

The instrument B (or B′) is in the nature of a sliding latch, while the instrument A (or A′) might be considered the needle. I am aware that needles with sliding latches are old, and my present invention is not restricted to the particular construction of sliding latch needle shown, as that forms the subject of Division A of this application for reissue.

When the described construction is used on stocking knitting machines, about one half of the needles have to be projected out of action by a suitable switch cam and picking devices, when knitting the heels and toes, and some of the needle elements A will be raised to the positions shown in Fig. 11. bringing the offset 26 in the shanks of the needles to a point to permit constant reciprocation of the hook of the member B past said offset 26 without interference with the thread wrapped about the shanks of the elevated and inactive needles.

A switch cam and picking devices suitable for this purpose are such as have commonly been used in circular hosiery knitting machines, as shown for example in my Patent 1,152,850. The switch cam in question will act upon the butts of the instruments A to carry them, at the proper time, out of the path of the usual knitting cams 30 and 31, Fig. 10, to pass between these cams 30 and 31 and the cams 40 and 41, which independently control the relatively movable instruments B.

The advantage of thus keeping the instruments B in reciprocation is that when the instruments A are afterwards restored to active position, these instruments B will not then interfere with the taking of the new loop by the instruments A.

I claim as my invention:—

1. A knitting machine needle in two parts in sliding relation to each other, one of said parts having an offset 26 for the purpose of accommodating the old loop when said needle part is projected out of knitting position.

2. A stocking knitting machine, provided with needles each in two relatively movable parts, one of said parts being to draw a loop and the other for casting, in combination with separate means to reciprocate the two parts independently of each other, the machine being constructed to permit, the loop drawing part to be moved to inactive position to hold a loop, while the casting part remains in reciprocation.

3. A stocking knitting machine, provided with needles each in two parts in sliding relation to each other, one of said parts being to draw a loop and the other for casting, in combination with separate cam means to reciprocate the two parts independently of each other, the machine being constructed to permit, the loop drawing part to be moved to inactive position to hold a loop while the casting part remains in reciprocation.

4. A stocking knitting machine, provided with needles, each in two relatively movable parts, one of said parts being to draw a loop and the other for casting, in combination with separate means to reciprocate the two parts independently of each other, the loop-drawing part having an offset to accommodate the old loop, when said loop-drawing part is moved to inactive position, while the casting part remains in reciprocation.

In testimony whereof I have signed my name to this specification.

ROBERT V. SCOTT.